(12) United States Patent
Wang et al.

(10) Patent No.: US 6,278,491 B1
(45) Date of Patent: Aug. 21, 2001

(54) APPARATUS AND A METHOD FOR AUTOMATICALLY DETECTING AND REDUCING RED-EYE IN A DIGITAL IMAGE

(75) Inventors: John Y. A. Wang; HongJiang Zhang, both of Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/015,407

(22) Filed: Jan. 29, 1998

(51) Int. Cl.[7] .................................................. H04N 5/222
(52) U.S. Cl. ............................................ 348/370; 382/117
(58) Field of Search ..................................... 348/207, 222, 348/239, 370, 576, 2; 382/115, 117, 162, 164, 167, 168, 169, 171, 172, 291, 201, 224, 118; 396/18; H04N 5/222

(56) References Cited

U.S. PATENT DOCUMENTS 5,164,992  11/1992  Turk et al. .............................. 382/2
5,990,973  * 11/1999  Sakamoto .............................. 348/576
6,016,345  * 1/2000  Lin et al. ............................... 382/117
6,134,339  * 10/2000  Lou ....................................... 382/115

OTHER PUBLICATIONS

Rowley et al., "Human Face Detection in Visual Scenes", 1995, Computer Vision, Artifical neural networks, Machine learning.

* cited by examiner

*Primary Examiner*—Tuan Ho
(74) *Attorney, Agent, or Firm*—Thomas X. Li

(57) ABSTRACT

An automatic red-eye detection and reduction system is described. The automatic red-eye detection and reduction system includes a red-eye detector that detects if an image contains a red pupil without user intervention. The red-eye detector detects location and size of the red pupil if the image is detected to contain the red pupil. The automatic red-eye detection and reduction system also includes a red-eye reduction system that is coupled to the red-eye detector to change each red color pixel within the red pupil into a predetermined color such that color of the red pupil can be detected and changed without user intervention. A method of automatically detecting and reducing red-eye effect in a digital image is also described.

19 Claims, 7 Drawing Sheets

APPARATUS AND A METHOD FOR AUTOMATICALLY DETECTING AND REDUCING RED-EYE IN A DIGITAL IMAGE

BACKGROUND OF THE INVENTION

1. Field of the Invention

The present invention pertains to digital image processing. More particularly, this invention relates to apparatus and a method for automatically detecting and reducing red-eye in a digital image without user intervention.

2. Description of the Related Art

As is known, photographing a person in a relatively dark environment requires flashlight to avoid under-exposure. The use of flashlight, however, often results in a person's eyes being red in the photograph, making the person look "spooky" or unnatural in the photograph. This is typically referred to as the "red-eye" phenomenon or simply red-eye.

The red-eye typically results from the person's pupils not being able to quickly adjust to the flashlight in darkness. As is known, the pupils of a person are enlarged in a dark environment. When flashlight appears, the pupils are not able to reduce their sizes due to the suddenness of the flashlight. This typically causes the flashlight reflecting off the retina at the back of the eyes, causing red-eye.

Several prior art techniques have been proposed to reduce the red-eye effect. A common prior art approach is to use multiple flashes in the camera to contract the pupils before a final flash is used to expose and capture the image. However, disadvantages are associated with this prior art approach. One disadvantage is the delay between the time when the first flashlight appears and the time when the picture is actually taken. This means the picture is taken several seconds after the exposure button has been pressed. This, however, may cause some kind of confusion. The subjects may move away from the posed positions before the image is captured, thinking that the picture taking process has been completed. Moreover, the red-eye problem still occurs when the user forgets to enable this feature of the camera during photographing, or when the camera is not equipped with such red-eye prevention feature. Further, this prior art approach cannot solve the red-eye problem in the already-taken photos.

With the advance of image processing technologies, it is now possible to digitize an image and store the digitized image in a computer system. This is typically done either using a digital camera to capture the image digitally, or using a scanner that converts the image into digital form. The digital image includes data representing image pixels arranged in a matrix. The data of the digital image are then stored in the computer. The digital image can be retrieved for display and can also be digitally altered in the computer.

Because images can now be captured as or converted into digital images, it is thus possible to correct the red-eye problem in an image digitally. Some prior art schemes have been proposed to correct the red-eye problem digitally. One such prior art scheme simply provides the user with means for manually painting over the red eyes digitally. The disadvantage of this prior art scheme is that some kind of painting skill is needed for the user to paint over the red eyes. Another disadvantage is that the correction of the red-eye is not done automatically, but rather manually.

Another prior art approach requires the user to precisely locate the center of a pupil so that a black circle is placed over the red-eye region. One disadvantage is that it cannot automatically detect the red eyes, but rather requires the user intervention (i.e., to precisely locate the positions of the red pupils). Another disadvantage of this prior art approach is that the red-eye region is often not a circular region. This may cause portions of the red-eye region not to be covered by the black circle. In addition, the black circle may not be able to cover the peripheral area (i.e., the pink ring) of the red-eye region.

Moreover, replacing the red pupil with a complete black circle may also cover the glint in the pupil. As is known, the glint in the pupil is usually a bright "white" spot. Thus, the result of this type of correction is often quite noticeable and undesirable, and sometimes destroys the natural appearance of the eyes in the image.

SUMMARY OF THE INVENTION

One feature of the present invention is to automatically detect and reduce red-eye in a digital image.

Another feature of the present invention is to automatically detect and reduce red-eye in an image without user intervention.

A further feature of the present invention is to automatically detect and reduce red-eye in an image using a face detection technology.

A still further feature of the present invention is to automatically detect and reduce red-eye in an image while maintaining the natural appearance of the eye.

An automatic red-eye detection and reduction system is described. The automatic red-eye detection and reduction system includes a red-eye detector that detects if an image contains a red pupil without user intervention. The red-eye detector detects location and size of the red pupil if the image is detected to contain the red pupil. The automatic red-eye detection and reduction system also includes a red-eye reduction system that is coupled to the red-eye detector to change each red color pixel within the red pupil into a predetermined color such that color of the red pupil can be detected and changed without user intervention.

A method for automatically detecting and reducing red-eye effect in a digital image is also described. The method includes the step of detecting if an image contains a red pupil without user intervention. The method also includes the step of determining location and size of the red pupil if the image is detected to contain the red pupil. Then each red color pixel within the red pupil is changed into a predetermined color such that color of the red pupil can be detected and changed without user intervention.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
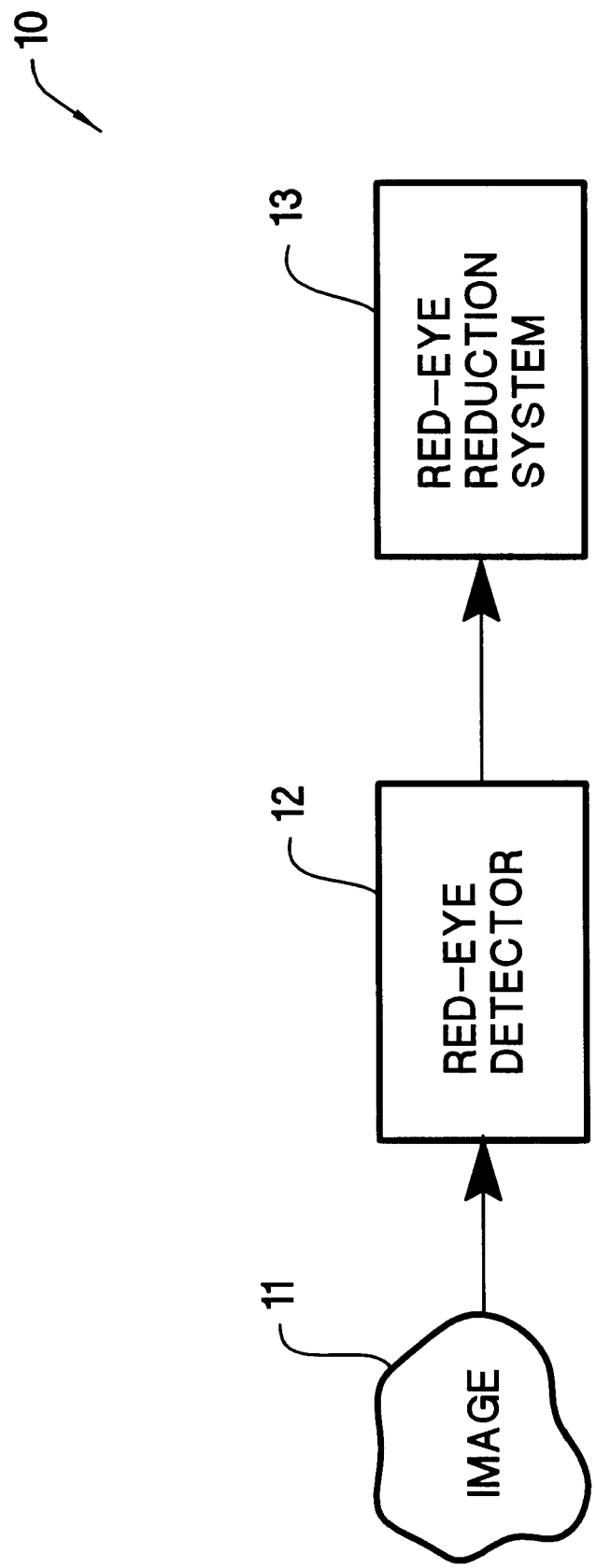
FIG. 1 shows an automatic red-eye detection and reduction system that implements one embodiment of the present invention, wherein the automatic red-eye detection and reduction system includes a red-eye detector and a red-eye reduction system.

FIG. 1 shows an automatic red-eye detection and reduction system 10 that implements one embodiment of the present invention. In accordance with one embodiment of the present invention, the automatic red-eye detection and reduction system 10 automatically detects and locates a red pupil of an eye in an image (e.g., the image 11) without user intervention. The automatic red-eye detection and reduction system 10 then reduces or minimizes the detected red pupil while maintaining the natural appearance of the eye again without user intervention.

As will be described in more detail below, the automatic red-eye detection and reduction system 10 includes a red-eye detector 12 and a red-eye reduction system 13. The red-eye detector 12 is used to automatically detect if the image 11 contains a red pupil in an eye without user intervention. The red-eye detector 12 does this by using a face or eye detection technology, such as the neural network face detection technology or principle component analysis face or eye detection technology. These technologies will be described in more detail below.

If the red-eye detector 12 detects the red pupil in the image 11, then the red pixels of the red pupil in the image 11 are sent to the red-eye reduction system 13 in which the color of each of the red pixels within the detected red pupil is changed into a predetermined color (e.g., monochrome). The monochrome can be either black or grey. The reduction is also done without user intervention. The automatic red-eye detection and reduction system 10 will be described in more detail below, also in conjunction with FIGS. 1 through 7.

Referring to FIG. 1, the automatic red-eye detection and reduction system 10 can be implemented by software, hardware, or firmware. This means that both modules 12 and 13 can be implemented by software, hardware, or firmware. In one embodiment, the automatic red-eye detection and reduction system 10 is a software application program that is run on a computer system (not shown). The computer system that runs the automatic red-eye detection and reduction system 10 can be a personal computer, a mini computer, a workstation computer, a notebook computer, a network computer, a server computer, a mainframe computer, or any other data processing system. Alternatively, one of the modules 12–13 of the automatic red-eye detection and reduction system 10 can be implemented by hardware or firmware while the other remains a software module.

Moreover, the automatic red-eye detection and reduction system 10 may be implemented in an imaging system (not shown). The imaging system can be an image display system, a scanner system, or simply a computer system having a display. The imaging system can also be other type of imaging system.

As can be seen from FIG. 1, the automatic red-eye detection and reduction system 10 receives the image 11 for red-eye detection and reduction. The image 11 is a digital image which can be obtained from an external image capturing device. Known image capturing devices include digital cameras, scanners. For example, the image 11 may be obtained by a digital camera. As another example, the image 11 may be obtained by scanning a photo using a scanner. The image 11 can be any kind of image and may show a person with "red-eye". As described above, the red-eye effect is a red colored pupil in an eye within the image 11.

To reduce the red-eye in the image 11, the automatic red-eye detection and reduction system 10 first determines if the image 11 contains an eye with a red pupil. This function is performed by the red-eye detector 12 of the automatic red-eye detection and reduction system 10. Unlike any prior art red-eye reduction system, the red-eye detector 12 of the automatic red-eye detection and reduction system 10 in accordance with one embodiment of the present invention automatically detects the red pupil or pupils in the image 11 without user intervention. The red-eye detector 12 also determines the location and size of the red pupil. The red pixels within the detected red pupil are then applied to the red-eye reduction system 13 where the color of each of the red pixels is changed to a predetermined color. In one embodiment, the predetermined color is monochrome (black or grey). Alternatively, the predetermined color may be other colors. The red-eye detector 12 will be described in more detail below, also in conjunction with FIGS. 2–6. The red-eye reduction system 13 will also be described in more detail below, in conjunction with FIG. 7.

Figure 2:
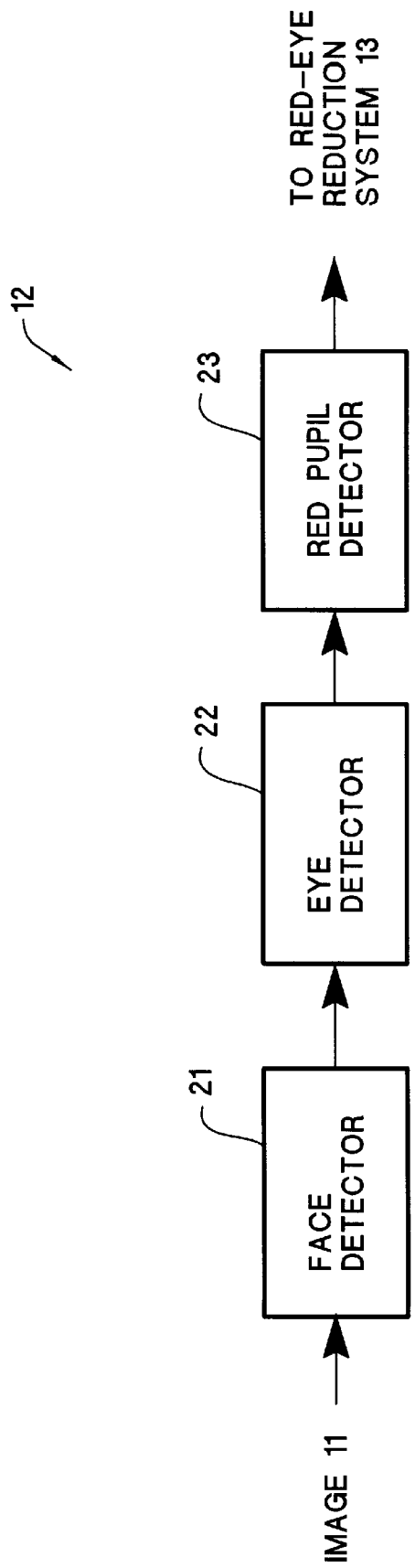
FIG. 2 shows in block diagram form the structure of the red-eye detector that includes a face detector, an eye detector, and a red pupil detector.

FIG. 2 shows the structure of the red-eye detector 12. As can be seen from FIG. 2, the red-eye detector 12 includes a face detector 21, an eye detector 22, and a red pupil detector 23. The face detector 21 is used to detect if the image 11 contains a human face (not shown in FIG. 1). The face detector 21 also determines the location, size, and orientation of the detected face. Once a face is detected by the face detector 21, the image portion of the image 11 that contains the detected face is sent to the eye detector 22 to detect if the detected face has an open eye and, if so, to determine the location, size, and orientation of the open eye. If the eye detector 22 detects that the detected face contains an open eye, the detected open eye is then sent to the red pupil detector 23 to detect if the detected open eye contains a red pupil. If the red pupil detector 23 detects that the detected open eye includes a red pupil, then the detected red pupil is sent to the red-eye reduction system 13 (FIG. 1) to replace the red color of the red pupil. Here, open eye or red pupil refers to the image portion that contains the detected open eye or the detected red pupil.

Although FIG. 2 shows that the red-eye detector 12 includes three modules (i.e., the modules 21–23), it is to be noted that the red-eye detector 12 may operate without some of the modules 21–23. For example, the red-eye detector 12 may not include the face detector 21. In this case, the image 11 is directly applied to the eye detector 22 to detect if the image 11 contains an open eye. As a further example, the red-eye detector 12 may not include the eye detector 22. In this case, the face detector 21 applies the detected face region directly to the red pupil detector 23 to detect the red pupil.

As can be seen from FIG. 2, the face detector 21 receives the image 11 in digital form. The face detector 21 then detects if the image 11 contains a face. If the image 11 contains a number of faces, the face detector 21 detects and locates each of the faces. The face detector 21 employs a face detection technology to detect if the image 11 contains a face. In one embodiment, the face detection technology used by the face detector 21 for face detection is the neural network-based face and eye detection technology. The neural network-based face and eye detection technology is disclosed in a publication entitled HUMAN FACE DETECTION IN VISUAL SCENES, by H. Rowley (har@cs.cmu.edu), S. Baluja (baluja@cs.cmu.edu), and T.

Kanade (tk@cs.cmu.edu) in November 1995. The publication is available from Carnegie Mellon University's Internet site at "www.ius.cs.cmu.edu/IUS/har2/har/www/CMU-CS-95-158R/." In another embodiment, the face detection technology used by the face detector 21 for face detection is the principle component analysis-based face and eye detection technology. This principle component analysis-based face and eye detection technology is disclosed in U.S. Pat. No. 5,164,992, dated Nov. 17, 1992, and entitled FACE RECOGNITION SYSTEM. Alternatively, other known face detection technologies may be used by the face detector 21.

Figure 3:
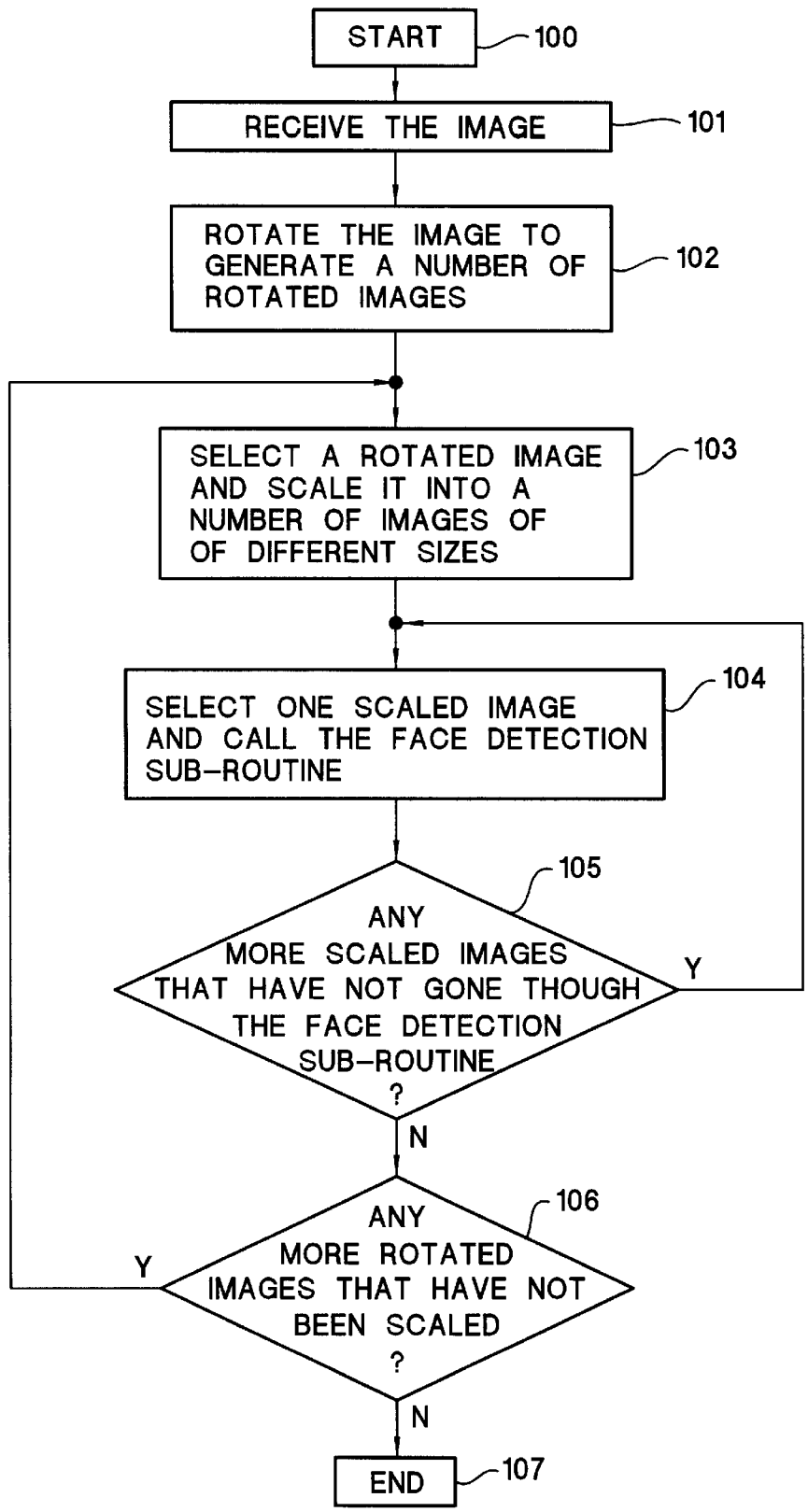
FIG. 3 is a flow chart diagram of the face detector.
Figure 4:
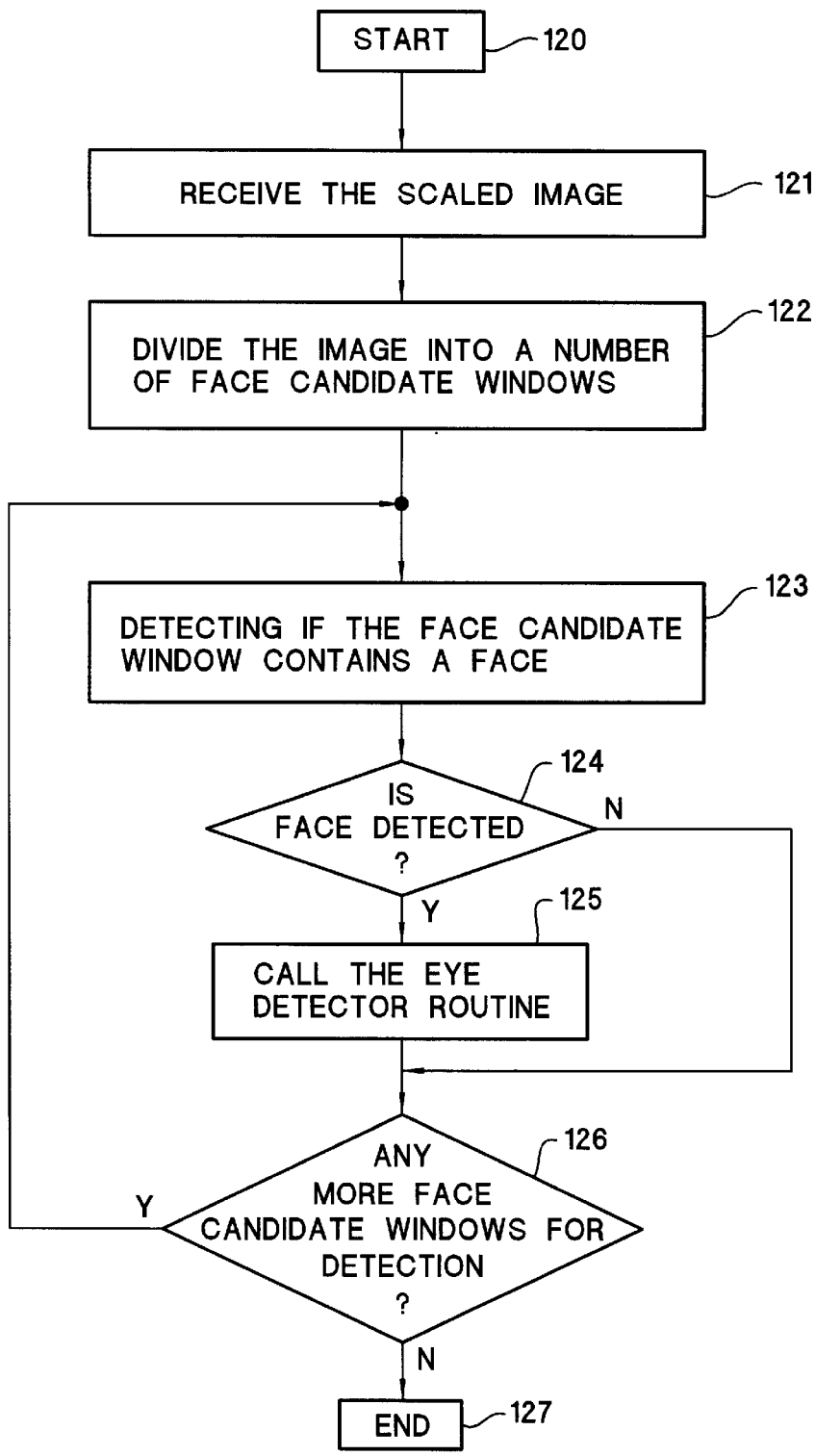
FIG. 4 is a flow chart diagram of a face detection sub-routine called by the face detector of FIG. 3.

When the face detector 21 employs the neural network-based face and eye detection technology, the face detector 21 detects if the image 11 contains a face by dividing the image 11 into a number of face candidate windows (not shown) and then detecting if each face candidate window contains a face by applying a set of neural network-based filters (also not shown) to each of the face candidate windows within the image 11. This is described in more detail in the above mentioned publication entitled HUMAN FACE DETECTION IN VISUAL SCENES. In this case, the face candidate windows can be nonoverlapping or overlapping. The filters examine each face candidate window in the image 11 at several scales, looking for locations that might contain a face (i.e., looking for eye locations). The face detector 21 then uses an arbitrator to combine the filter outputs. The arbitrator is used to merge detections from individual filters and eliminate overlapping detections. As a result, the face detector 21 detects faces. Using the neural network-based face and eye detection technology for the face detector 21 makes the face detection robust, relatively fast, and detect most faces. In addition, it allows the face detector 21 to detect different kinds of faces with different poses and lightings. FIGS. 3 and 4 show in flow chart diagram form the automatic face detection process of the face detector 21, employing the neural network-based face and eye detection technology.

As can be seen from FIG. 3, the process starts at the step 100. At the step 101, the face detector 21 receives the image 11. At the step 102, the face detector 21 rotates the image to generate a number of rotated images of the image 11. The purpose of rotating the image 11 is to allow detection of faces at various orientations in the image 11. The number of rotated images is not critical to the present invention and may vary according to the user's requirement.

At the step 103, the face detector 21 selects one of the rotated images of the image 11 and scales the selected image into a number of images of different sizes. At the step 104, the face detector 21 selects one scaled image and then call the face detection sub-routine to detect if the selected scaled image contains any face. At the step 105, the face detector 21 determines if there is any more scaled image that has not been through the face detection sub-routine. If so, the step 104 is repeated. If not, then the step 106 is performed to determine if there is any more rotated image that has not been scaled for face detection. If the answer is yes, then the process returns to the step 103. If the answer is no, then the process ends at the step 107.

Referring to FIG. 4, the face detection sub-routine run by the face detector 21 starts at the step 120. At the step 122, the scaled image is divided into a number of face candidate windows. As described above, the face candidate windows can be overlapping or non-overlapping. At the step 123, the face detector 21 detects if a face candidate window contains a face. If it is determined that a face is detected at the step 124, then the step 125 is performed, at which the eye detector 22 is called to determine if the face contains an open eye.

In the embodiment in which the red-eye detector 12 does not contain the eye detector 22, the face detector 21 then directly calls the red pupil detector 23 at the step 125. If, at the step 124, it is determined that the face candidate window does not contain a face, the step 125 is skipped.

At the step 126, if there are more undetected face candidate windows, the process goes back to the step 123. Otherwise, the process ends at the step 127.

Referring back to FIG. 2, when the face detector 21 detects that the image 11 contains a face, the detected face region in the image 11 is then sent to the eye detector 22. If the image 11 contains a number of detected faces, each of the detected faces is sent to the eye detector 22. The eye detector 22 then detects if the face region contains an open eye. The eye detector 22 employs an eye detection technology to detect if the face region contains an open eye. In one embodiment, the eye detection technology used by the eye detector 22 for eye detection is the neural network-based face and eye detection technology, which is disclosed in the above mention publication entitled HUMAN FACE DETECTION IN VISUAL SCENES. In another embodiment, the eye detection technology used by the eye detector 22 for open eye detection is the principle component analysis-based face and eye detection technology, which is disclosed in U.S. Pat. No. 5,164,992. Alternatively, other known eye detection technologies may be used by the eye detector 22.

Figure 5:
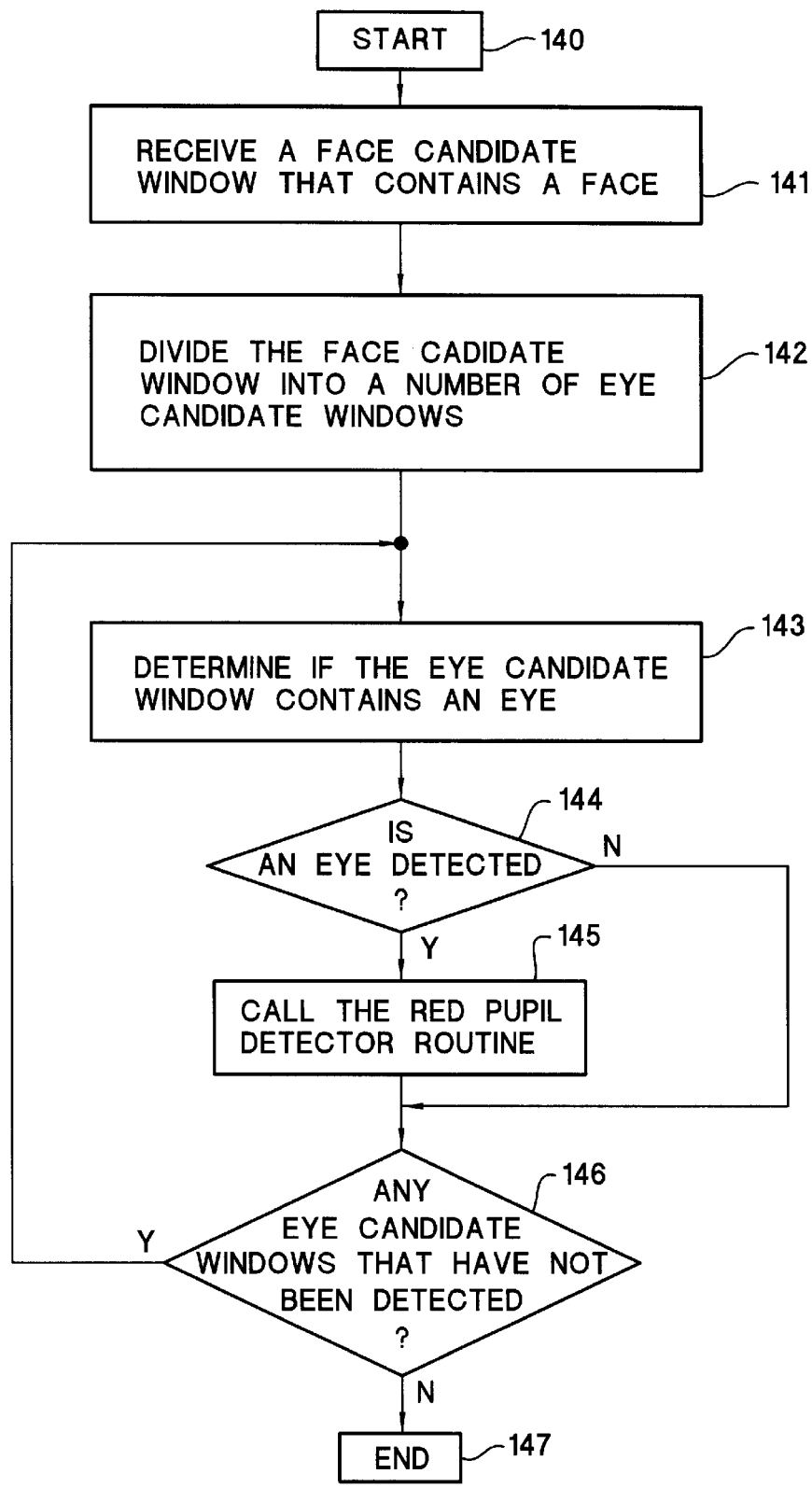
FIG. 5 is a flow chart diagram of the eye detector.

When the eye detector 22 employs the neural network-based face and eye detection technology, the eye detector 22 detects if the face region contains an open eye by dividing the face region of the image 11 into a number of eye candidate windows (not shown) and then detecting if each eye candidate window contains an open eye by applying a set of neural network-based filters (also not shown) to each of the eye candidate windows within the face region. The eye candidate windows can be non-overlapping or overlapping. The filters examine each eye candidate window at several scales, looking for eye locations. The eye detector 22 then uses an arbitrator to combine the filter outputs. The arbitrator is used to merge detections from individual filters and eliminate overlapping detections. As a result, the eye detector 22 detects open eyes. When both the face detector 21 and eye detector 22 use the neural network-based face and eye detection technology, the face detector 21 outputs the locations of the eyes within a detected face. The eye detector 22 then applies the same technology to detect if the eyes are open and to refine the detected eye locations within the face region. Using the neural network-based face and eye detection technology for the eye detector 22 makes the eye detection robust, relatively fast, and detect most faces. In addition, it allows the eye detector 22 to detect different kinds of eyes with different poses and lightings. FIG. 5 shows in flow chart diagram form the automatic eye detection process of the eye detector 22, employing the neural network-based face and eye detection technology.

As described above, the red-eye detector 12 of FIG. 1 may function without the face detector 21 (shown in FIG. 2). In this case, the eye detector 22 will receive the entire image 11 instead of the detected face region of the image 11.

Referring to FIG. 5, the automatic eye detection process starts at the step 140. At the step 141, the eye detector 22 of FIG. 2 receives the face region (i.e., the face candidate window that contains a face). At the step 142, the face region or window is divided into a number of eye candidate windows. At the step 143, the eye detector 22 determines if an eye candidate window contains an open eye using the neural network-based eye detection technology. At the step 144, it is determined if an open eye is detected. If so, the eye detector 22 calls for the red pupil detector 23 at the step 145. If not, the step 145 is skipped. The step 146 is another determination step which determines if there is any more eye candidate window that has not been detected by the eye detector 22. If the answer is yes, then the process returns to the step 143. If no, the process ends at the step 147.

Figure 6:
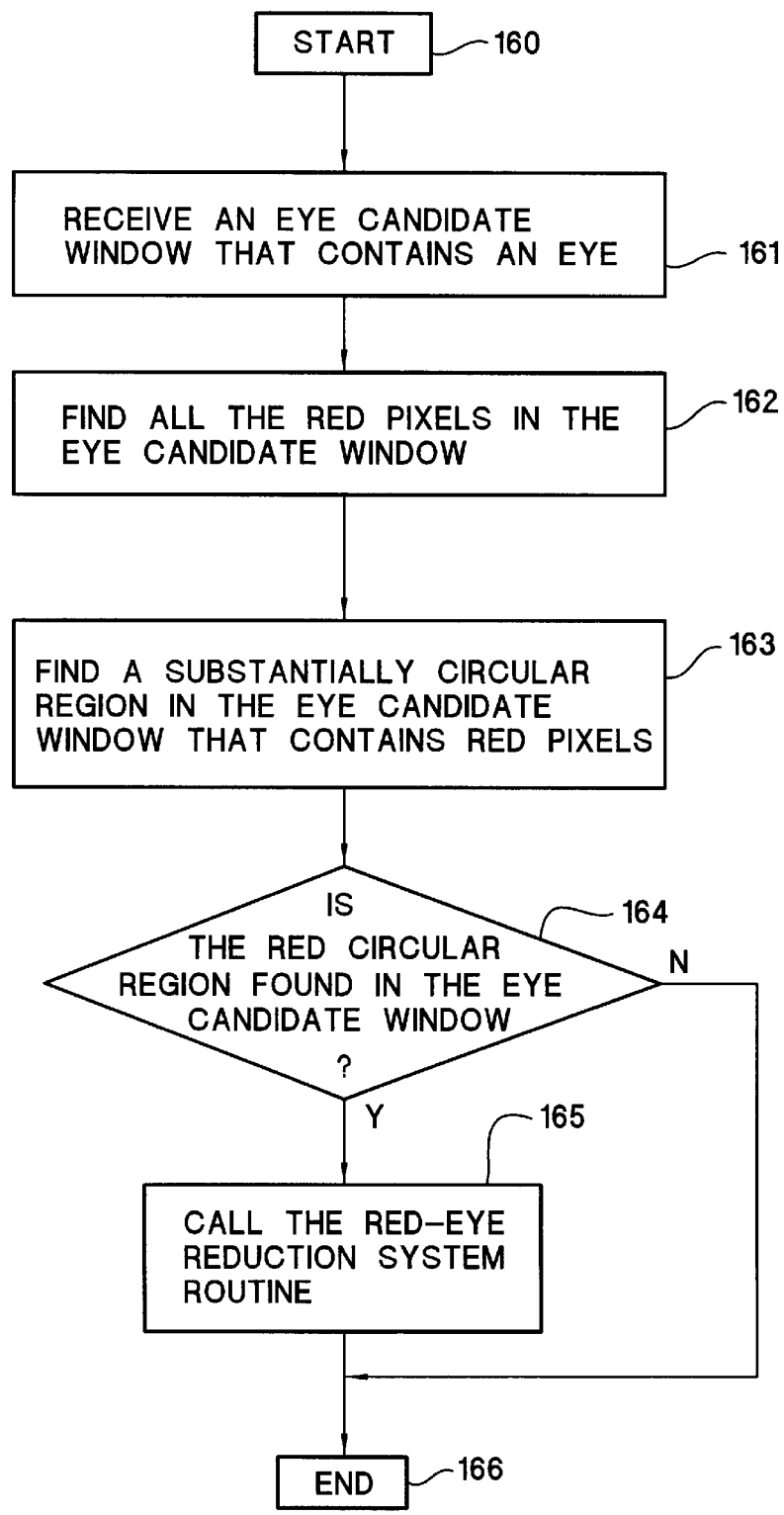
FIG. 6 is a flow chart diagram of the red pupil detector.

Referring back to FIG. 2, when the eye detector 22 detects that a face in the image 11 contains an open eye, the open eye region is then sent to the red pupil detector 23 to detect if the open eye contains a red pupil. The function of the red pupil detector 23 is to detect the substantially circular region in the open eye region that contains red pixels. If the red pupil detector 23 detects that the open eye region contains such circular region, then the detected open eye contains a red pupil which needs to be corrected by the red-eye reduction system 13. If the red pupil detector 23 does not detect a substantially circular region filled with red pixels, the open eye does not contain a red pupil and the red-eye reduction system 13 is not activated. FIG. 6 shows in flow chart diagram form the process of detecting red pupil of the red pupil detector 23, which will be described in more detail below.

As can be seen from FIG. 6, the process starts at the step 160. At the step 161, the image region that contains the detected open eye (i.e., the open eye region or eye candidate window) is sent from the eye detector 22 to the red pupil detector 23. At the step 162, the red pupil detector 23 finds all the red pixels in the eye candidate window. This can be done using any known redness detector or filter. Then the red pupil detector 23 locates a substantially circular region in the eye candidate window that contains red pixels at the step 163. This also can be realized by, for example, software programs.

The step 164 is a determination step at which the red pupil detector 23 determines if the circular region is found in the eye candidate window. If so, the step 165 is performed at which red-eye reduction system 13 of FIG. 1 is activated or called if the red-eye reduction system 13 is implemented by software. The process then ends at the step 166. If, at the step 164, it is determined that the eye candidate window does not contain the circular region, then the process ends at the step 166.

Figure 7:
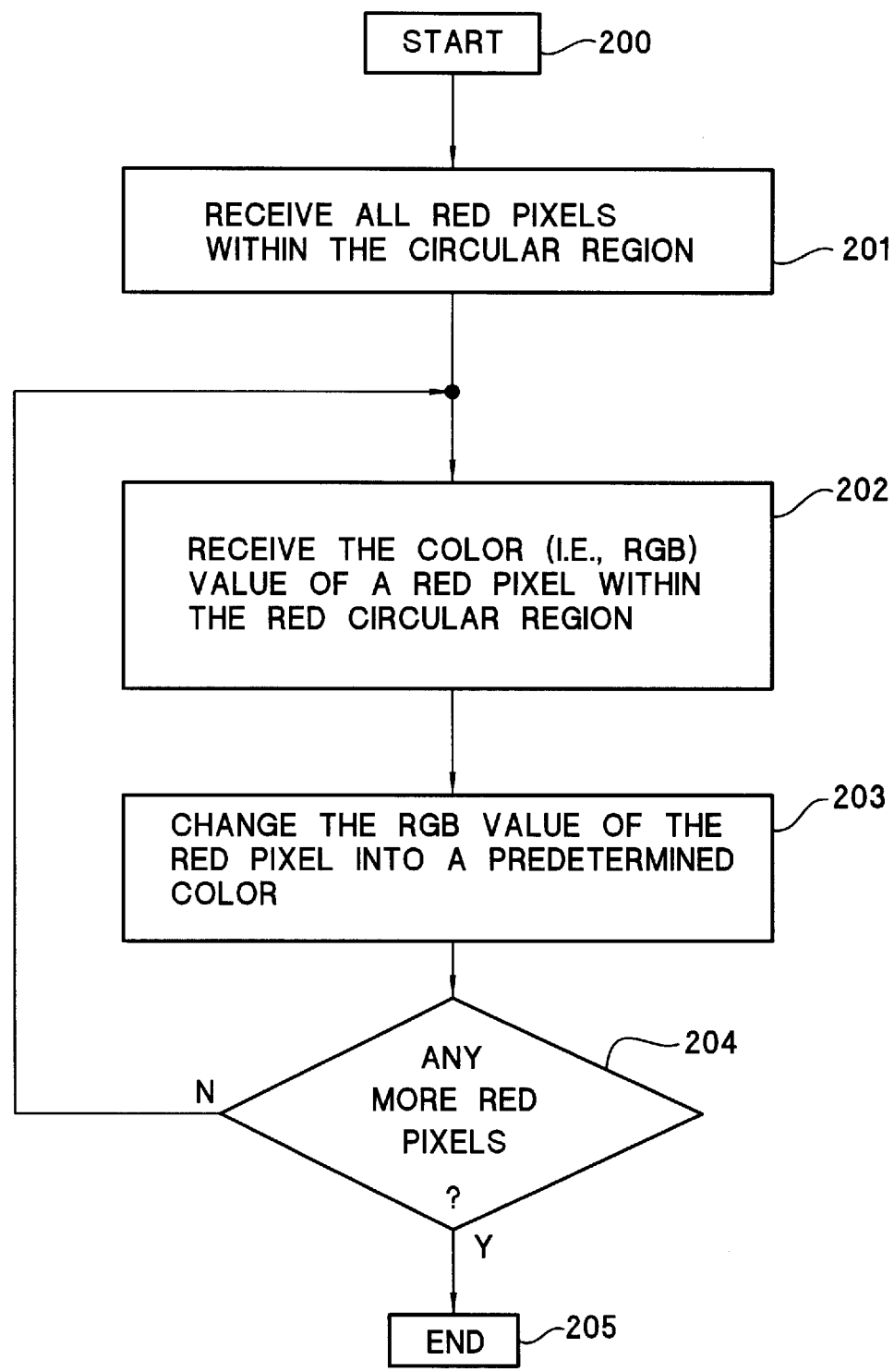
FIG. 7 is a flow chart diagram of the red-eye reduction system of FIG. 1.

Referring back to FIG. 1, when the red-eye detector 12 detects that the image 11 contains a red pupil, the red pupil region is then sent to the red-eye reduction system 13 for color correction (i.e., red-eye reduction). The red-eye reduction system 13 reduces the red-eye by changing the color of each red pixel within the red pupil into another predetermined color. FIG. 7 shows the flow chart diagram of the red-eye reduction process of the red-eye reduction system 13, which will be described in more detail below.

As can be seen from FIG. 7, the process starts at the step 200. At the step 201, all the red pixels within the red pupil (identified as circular region by the red pupil detector 23 of FIG. 2) are received in the red-eye reduction system 13. At the step 202, the red-eye reduction system 13 receives the color (e.g., Red-Green-Blue (RGB)) value of a red pixel within the red circular region. At the step 203, the red-eye reduction system 13 changes the RGB value of the red pixel to a predetermined color (e.g., monochrome). Then at the step 204, the red-eye reduction system 13 determines if the red circular region (i.e., the detected red pupil) has more red pixels that have not gone through the process. If so, the step 202 is repeated. If not (this means that all red pixels within the red circular region have gone through the process), the red-eye reduction process ends at the step 205.

The red-eye reduction process shown in FIG. 7 implements one embodiment of the present invention for the red-eye reduction system 13. Alternatively, the red-eye reduction process of the red-eye reduction system 13 may "grow" the red circular region by changing color of the adjacent pixels of the red circular region that have their colors sufficiently red. This will make the red pupil to look more natural after color correction.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An automatic red-eye detection and reduction system, comprising:

a red-eye detector that detects if an image contains a red pupil without user intervention, wherein the red-eye detector detects location and size of the red pupil if the image is detected to contain the red pupil, wherein the red-eye detector further comprises a face detector that detects if the image contains a face, wherein the face detector determines the location, size, and orientation of the face if the image is detected to contain the face;

a red pupil detector coupled to the face detector to determine if the face contains the red pupil, wherein the red pupil detector determines the location and size of the red pupil within the face if the face is detected to contain the red pupil;

a red-eye reduction system coupled to the red-eye detector to change each red color pixel within the red pupil into a predetermined color such that color of the red pupil can be detected and changed without user intervention.

2. The system of claim 1, wherein the face detector is one of a neural network-based face detector and a principle component analysis-based face detector.

3. The system of claim 1, further comprising a rotating module that rotates the image for a predetermined rotation angle before the image is sent to the face detector, wherein the orientation of the face is determined by the rotation angle of the image if the image is detected to contain the face.

4. An automatic red-eye detection and reduction system, comprising:

a red-eye detector that detects if an image contains a red pupil without user intervention, wherein the red-eye detector detects location and size of the red pupil if the image is detected to contain the red pupil, wherein the red-eye detector further comprises an eye detector that detects if the image contains an eye, wherein the eye detector determines the location, size, and orientation of the eye within the image if the image is detected to contain the eye;

a red pupil detector coupled to the eye detector to determine if the eye contains the red pupil, wherein the red pupil detector determines the location and size of the red pupil within the eye if the eye is detected to contain the red pupil;

a red-eye reduction system coupled to the red-eye detector to change each red color pixel within the red pupil into a predetermined color such that color of the red pupil can be detected and changed without user intervention.

5. The system of claim 4, wherein the eye detector is one of a neural network-based eye detector and a principle component analysis-based eye detector, wherein the red pupil detector determines if the eye contains the red pupil by locating a substantially circular region within the eye that contains red color pixels.

6. The system of claim 4, further comprising a rotating module that rotates the image for a predetermined rotation angle before the image is sent to the eye detector, wherein the orientation of the eye is determined by the rotation angle of the image if the image is detected to contain the eye.

7. An automatic red-eye detection and reduction system, comprising:

a red-eye detector that detects if an image contains a red pupil without user intervention, wherein the red-eye detector detects location and size of the red pupil if the image is detected to contain the red pupil, wherein the red-eye detector further comprises a face detector that detects if the image contains a face, wherein the face detector determines the location, size, and orientation of the face if the image is detected to contain the face;

an eye detector coupled to the face detect or to detect if the face contains an eye, wherein the eye detector determines the location, size, and orientation of the eye within the face if the face is detected to contain the eye;

a red pupil detector coupled to the eye detector to determine if the eye contains the red pupil, wherein the red pupil detector determines the location and size of the red pupil within the eye if the eye is detected to contain the red pupil;

a red-eye reduction system coupled to the red-eye detector to change each red color pixel within the red pupil into a predetermined color such that color of the red pupil can be detected and changed without user intervention.

8. The system of claim 7, wherein the face detector is one of a neural network-based face detector and a principle component analysis-based face detector, wherein the eye detector is one of a neural network-based eye detector and a principle component analysis-based eye detector.

9. The system of claim 7, wherein the red pupil detector determines if the eye contains the red pupil by determining a substantially circular region within the eye that contains red color pixels.

10. The system of claim 7, further comprising a rotating module that rotates the image for a predetermined rotation angle before the image is sent to the face detector, wherein the orientation of the face is determined by the rotation angle of the image if the image is detected to contain the face.

11. A method for automatically detecting and reducing red-eye effect in a digital image, comprising:

(A) detecting if an image contains a red pupil without user intervention, wherein the location and size of the red pupil is also determined if the image is detected to contain the red pupil, wherein the step (A) further comprises the steps of (I) detecting if the image contains a face and, if so, the location, size, and orientation of the face;

(II) detecting if the face contains the red pupil and, if so, the location and size of the red pupil within the eye;

(B) changing each red color pixel within the red pupil into a predetermined color such that color of the red pupil ca n be detected and changed without user intervention.

12. The method of claim 11, wherein the step (A) further comprises the step of rotating the image for a predetermined rotation angle prior to the step (I), wherein the orientation of the face is determined by the rotation angle.

13. The method of claim 11, wherein the step (II) determines if the face contains the red pupil by determining a substantially circular region within the face that contains red color pixels.

14. The method of claim 11, wherein the step (A) further comprises the steps of (I) detecting if the image contains a face and, if so, the location, size, and orientation of the face;

(II) determining if the face contains a substantially open eye and, if so, the location of the eye within the face (III) determining if the eye contains the red pupil and, if so, the location and size of the red pupil within the eye.

15. The method of claim 14, wherein the step of (III) determines if the eye contains the red pupil by determining a substantially circular region within the eye that contains red color pixels.

16. The method of claim 19, wherein the step (A) further comprises the step of rotating the image for a predetermined rotation angle prior to the step (I), wherein the orientation of the face is determined by the rotation angle.

17. A method for automatically detecting and reducing red-eye effect in a digital image, comprising:

(A) detecting if an image contains a red pupil without user intervention, wherein the location and size of the red pupil is also determined if the image is detected to contain the red pupil, wherein the step (A) further comprises the steps of (I) detecting if the image contains an eye and, if so, the location, size, and orientation of the eye within the image;

(II) determining if the eye contains the red pupil and, if so, the location, size, and orientation of the red pupil within the eye;

(B) changing each red color pixel within the red pupil into a predetermined color such that color of the red pupil can be detected and changed without user intervention.

18. The method of claim 17, wherein the step (II) determines if the eye contains the red pupil by determining a substantially circular region within the eye that contains red color pixels.

19. The method of claim 17, wherein the step (A) further comprises the step of rotating the image for a predetermined rotation angle prior to the step (I), wherein the orientation of the eye is determined by the rotation angle.

* * * * *